April 1, 1958 W. E. FOLKERTS 2,828,721
FLUID PRESSURE ACTUATED POWER BOOSTER APPARATUS
HAVING VARIABLE REACTION MEANS
Filed Dec. 8, 1955 3 Sheets-Sheet 3

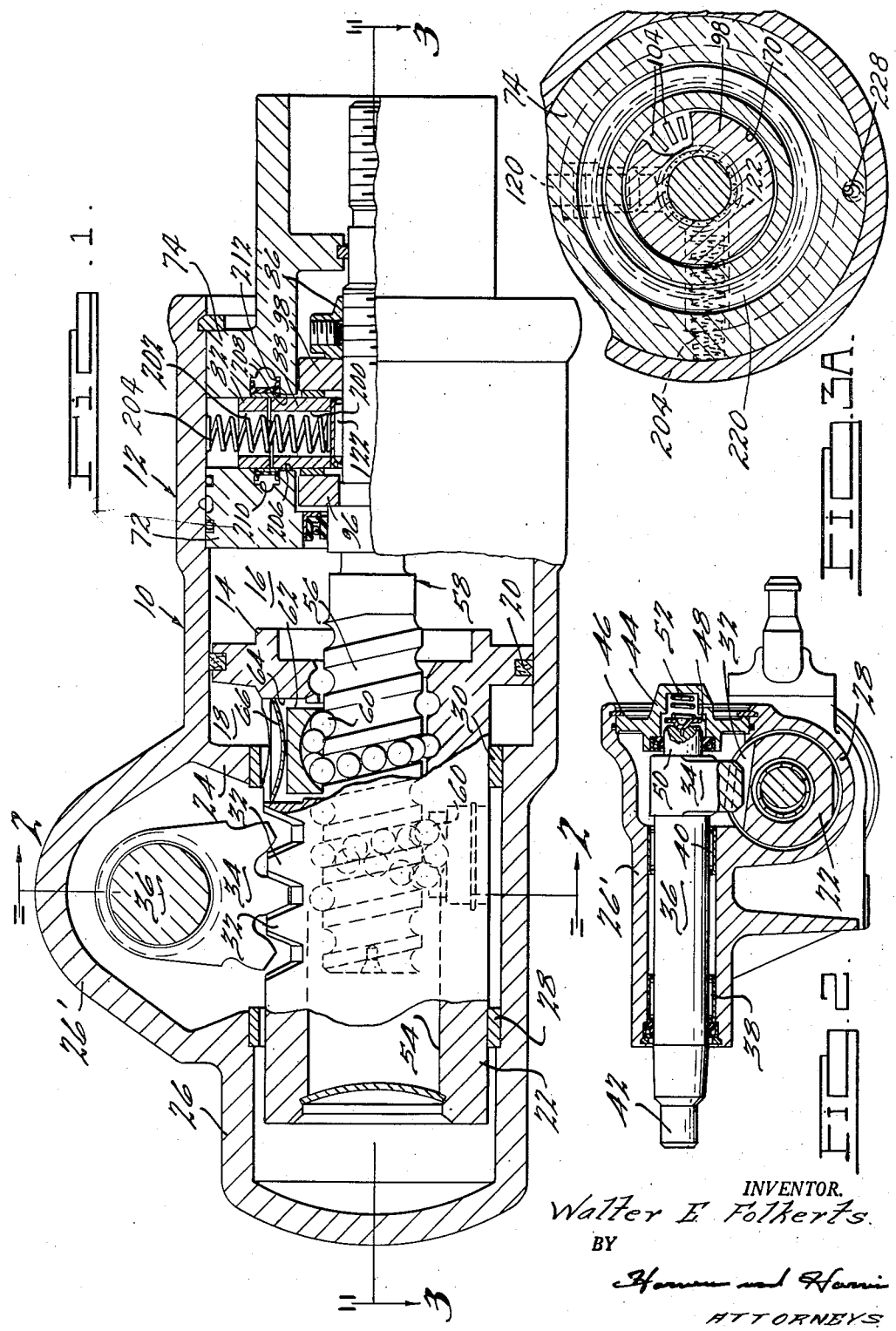

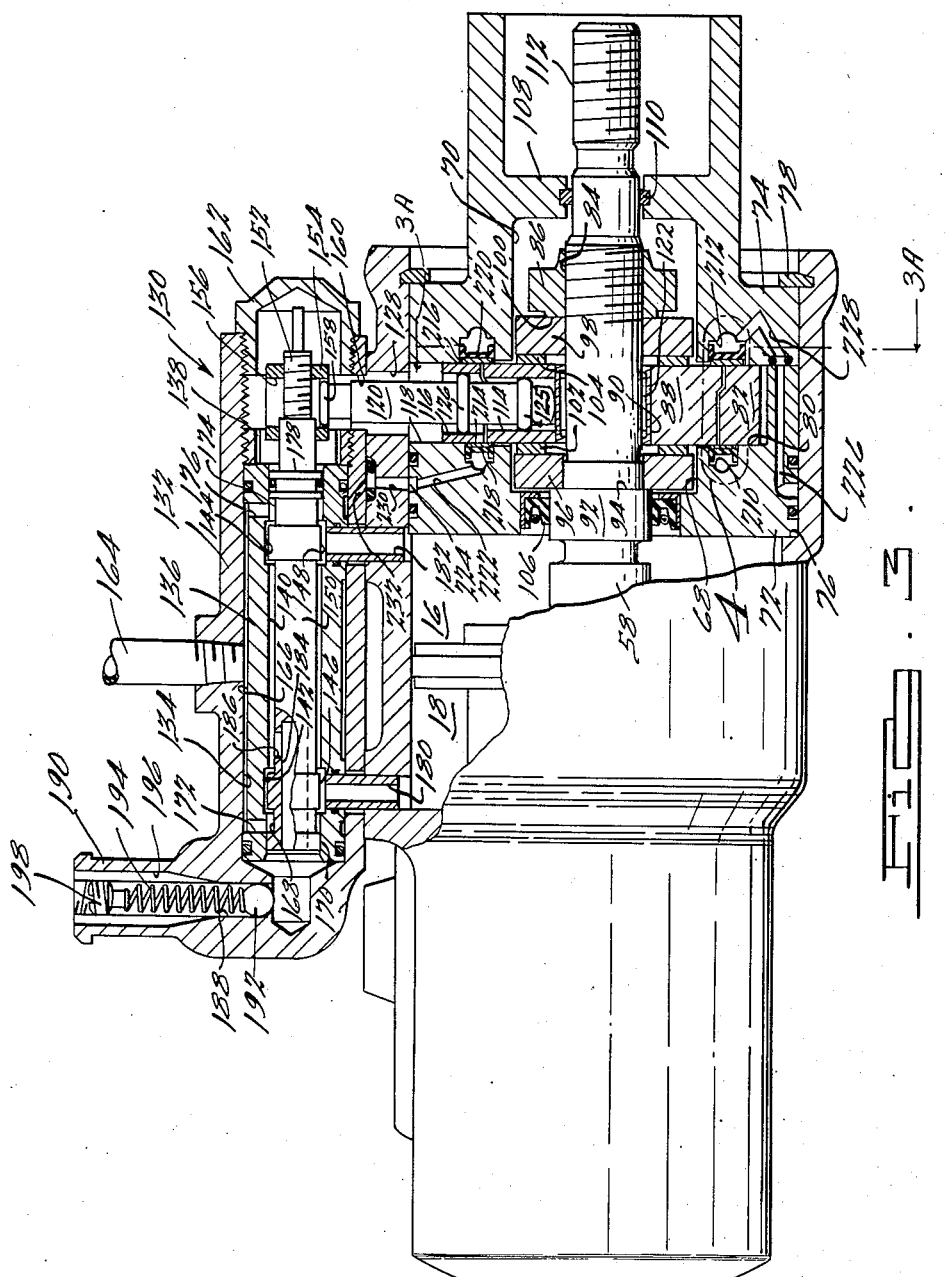

INVENTOR.
Walter E. Folkerts.
BY
Harmon and Harris
ATTORNEYS.

United States Patent Office 2,828,721
Patented Apr. 1, 1958

2,828,721

FLUID PRESSURE ACTUATED POWER BOOSTER APPARATUS HAVING VARIABLE REACTION MEANS

Walter E. Folkerts, Hazel Park, Mich., assignor to Chrysler Corporation, Highland Park, Mich., a corporation of Delaware Application December 8, 1955, Serial No. 551,790

11 Claims. (Cl. 121—41)

My instant invention relates generally to a new and improved fluid pressure actuator having a driving fluid motor with control elements thereof operatively connected to a manually operable member to effect manual adjustments of the same.

More particularly my invention comprises an improved fluid pressure reaction means for applying a resistance to manual movement of the manually operable member which is proportional to the magnitude of the driving effort exerted by the fluid motor upon the driven portions of the mechanism.

According to a principal feature of my invention, provision is made for limiting the resistance applied by the pressure reaction means to the manually operable member to a maximum value during operation of the mechanism under certain extreme operating conditions without affecting the normal operation of the pressure reaction means under other operating conditions. The structure of my instant invention may be readily applied to the power steering mechanism for a wheeled vehicle wherein a movable piston member of the fluid motor is drivably connected to the steering linkage elements for adjustably controlling the directional variations of the dirigible wheels. One such steering mechanism is disclosed in my copending application, Serial No. 523,603 filed July 21, 1955, and reference may be had thereto for the purpose of supplementing my instant disclosure.

The steering mechanism of my copending application includes a fluid circuit for supplying fluid under pressure to either one or the other of the working chambers situated on opposed sides of a working piston while simultaneously exhausting fluid from the other side of the cylinder to a low pressure exhaust circuit thereby creating a pressure differential across the piston. A control valve mechanism partly defines and is situated within the fluid circuit for selectively distributing fluid pressure to either of the working chambers depending upon the desired direction of the steering movement. A manually operable steering member is threadably connected to the piston and a valve actuating element is positioned within the assembly for the purpose of operatively connecting a movable portion of the valve mechanism with the manually operable member thereby enabling the vehicle operator to adjustably control the valve mechanism during steering maneuvers of the vehicle. The manually operable member may be connected to and form a portion of the vehicle steering wheel shaft.

Pressure reaction elements are situated within the assembly in the vicinity of the above-mentioned valve actuator element and they are adapted to be subjected to the fluid pressure existing in the high pressure portion of the fluid circuit thereby opposing displacement of the valve actuating element with a force which is proportional to the magnitude of the pressure applied thereto. This in turn imparts a resistance to movement of the manually operable member thereby opposing steering movements of the steering shaft by the operator. Since the degree of power assist obtained by the fluid motor is directly proportional to the magnitude of the fluid pressure in the fluid circuits supplying the working chambers of the fluid motor with working fluid, and since the pressure exerted on the pressure reaction elements is also proportional to the magnitude of the fluid pressure existing in this fluid circuit, the resistance offered to manual operation of the steering shaft will be proportional to the resistance to directional variations of the vehicle wheels.

My present invention represents an improvement over my previously disclosed structure and it comprises pressure reaction means wherein provision is made for rendering the same partially inoperative when the reaction pressure applied thereto exceeds a desired maximum value thereby reducing the manual effort required to operate the dirigible wheels of the vehicle during parking maneuvers and while "dry steering" on paved roads.

The resistance applied to the manually operable portions of the mechanism provides the vehicle operator with a normal steering sensation thereby enabling him to maintain a "feel of the road." However, when the steering forces required to maintain directional control of the vehicle wheels becomes undesirably large, the reaction limiting means of my instant invention reduces the rate of change of resistance to movement of the manually operable portions of the unit for a given change in the steering requirements thereby eliminating unnecessary driver fatigue and inconvenience.

The provision of a power steering apparatus of the type above described being a principal object of my invention, it is another object of my invention to provide a power steering apparatus wherein the reaction limiting feature above described is inherent in the elements which comprise the pressure reaction means.

It is another object of my invention to provide a power steering apparatus having a pressure reaction limiting feature as above described, which is simple in construction and which requires no additional elements other than those which are required by the pressure reaction means itself.

Other objects and features of my invention will readily become apparent from the following description taken in conjunction with the accompanying drawings wherein:

Figure 1 shows a longitudinal cross sectional view of the power boosting mechanism within which the reaction limiting feature of my instant invention is applied;

Figure 2 is a transverse cross sectional view on a reduced scale of the power steering gear of Figure 1 taken along section line 2—2 of Figure 1;

Figure 3 is a longitudinal cross sectional view of the steering gear of Figure 1 taken along a plane 90° out of phase with respect to the plane of Figure 1 as indicated by section line 3—3 of Figure 1;

Figure 3A is a sectional view taken in the direction of the arrows substantially along the line 3A—3A of Figure 3.

Figure 4:
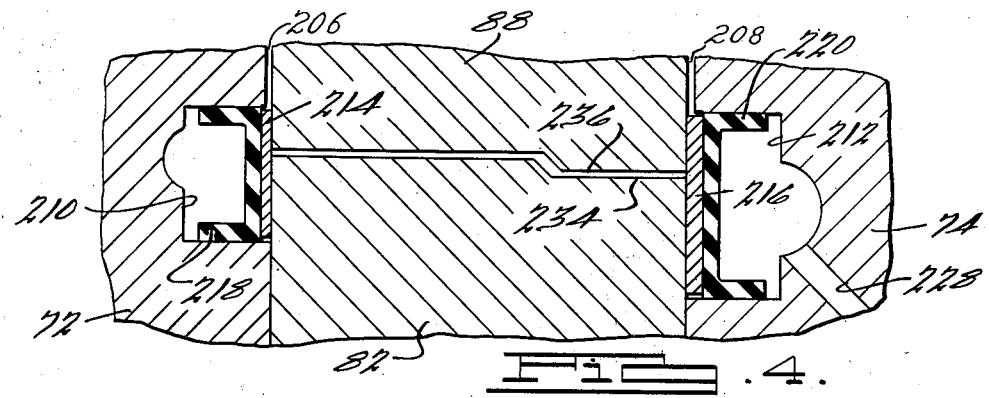
Figure 4 is a detail sectional view of a portion of the pressure reaction mechanism of the steering gear unit of Figures 1 and 3 and is shown on an enlarged scale.

Referring first to Figure 1, the numeral 10 is used to generally designate a unitary cast body defining a cylindrical section 12 within which is slidably positioned a piston 14, said piston defining a pair of opposed working chambers 16 and 18. The piston 14 may be provided with a suitable peripheral fluid packing 20 and may be formed with an axial extension 22 received through a separating wall 24, said wall 24 being formed integrally with the cast body 10. The extension 22 is enclosed by a lower body section 26 of the cast body 10, the interior of which communicates with working chamber 18 through the opening in the separating wall 24. By preference the extension 22 of the piston 14 is substantially cylindrical in shape and is slidably supported by spacer rings 28 and 30 situated within the section 26 at axially spaced locations. The upper side of the piston extension 22 may be formed with gear rack teeth as indicated at 32 and a gear sector 34 may be drivably engaged with the teeth 32 and rotated thereby about the axis of a rocker shaft 36 to which the sector gear 34 may be secured.

Referring next to Figure 2 it may be seen that the rocker shaft 36 is journalled at spaced locations in the protruding portion 26' of the body section 26 by means of spaced needle bearings 38 and 40. An end 42 of the rocker shaft 36 extends to the exterior of the body section 26 and is adapted to be drivably connected to a pitman arm for an automotive steering linkage assembly.

The end of the protruding portion 26' of the body section 26 may be closed by a closure member indicated in Figure 2 by numeral 44, said closure member being secured in place by a removable snap ring 46. The center of the closure member 44 is recessed at 48 to receive a reduced diameter extension 50 of the rocker shaft 36, the latter being urged to the left as viewed in Figure 2 by a spring 52 situated within the recess 48. The fluid pressure existing within the interior of the body section 26 is effective to urge the rocker shaft 36 to the left as viewed in Figure 2 thereby urging the sector gear teeth into engagement with the rack teeth 32 to provide a zero backlash connection between the piston extension 22 and the rocker shaft 36. The gear teeth 32 and the sector gear teeth are each formed with a progressively decreasing depth and thickness, as indicated in Figure 2, to permit this zero backlash adjustment to take place.

Referring again to Figure 1, the piston 14 and its axial extension 22 are provided with a hollow interior 54 for receiving an externally threaded end 56 of a piston rod generally designated by numeral 58. The portion of the piston 14 and the extension 22 are formed with internal threads which cooperate with the external threads formed on the piston rod end 56 to define a helical groove of circular cross section which are adapted to receive a plurality of balls 60 thereby forming a driving connection between the piston 14 and the piston rod 58. The balls 60 are disposed in axially spaced circuits as indicated, each circuit being of a recirculating endless type by reason of a bridge element shown at 62, which transfers the balls from one convolution of the helical grooves, above mentioned, to an adjacent convolution as the piston rod 58 is rotated with respect to the piston 14. The bridge element 62 is formed with a grooved recess defining a path through which the balls 60 may pass while being transferred from one convolution to the other, and it is received within a radial opening 64 formed in the piston extension 22. A suitable retainer element 66 may be inserted in the opening 64 to retain the bridge element 62 in position.

As best seen in Figures 1 and 3, the piston rod 58 extends axially in an outward direction through openings 68 and 70 formed in end closure members 72 and 74 respectively, said closure members being received within the open end of the cylindrical section 12 of cast body 10. Closure members 72 and 74 are situated in juxtaposed and engaged relationship between an internal shoulder 76 formed within the body section 12 and a removable snap ring 78. The closure member 72 is recessed as shown at 80 and a reaction spacer ring 82 is received therein and held in fixed relationship with respect to the body portion 10.

The piston rod 58 is formed with a threaded section 84 and an internally threaded backup element 86 is threadably received on the piston rod section 84. A reaction member 88 of generally cylindrical configuration is received within the reaction spacer ring 82 and is formed with a central opening 90 for receiving therethrough the piston rod 58, a slight clearance being provided between the periphery of the reaction member 88 and the surrounding reaction ring 82. The piston rod 58 is formed with an embossment 92 defining a shoulder 94 against which is seated a spacer or closure 96, the latter being centrally apertured to permit assembly of the same over the end of the shaft 58. A second centrally apertured spacer or closure 98 is received over the end of the piston rod 58 and is seated against a shoulder 100 defined by the nut 86. Radial needle bearings 102 and 104 are positioned, as shown, between the reaction member 88 and each of the juxtaposed spacers 96 and 98 respectively. A fluid seal 106 is disposed about the embossment 92 to contain fluid pressure within the working chamber 16 and to prevent the same from entering into the central openings 68 and 70 respectively, formed in the closure members 72 and 74. The outermost end of the piston rod 58 extends through a central opening formed in a partition 108 formed in the closure member 74 and partly defining the opening 70, and a suitable packing 110 may be provided as indicated, to prevent any leakage of fluid to the exterior of the unit. The outwardly extending end 112 of the piston rod 58 may be suitably adapted to accommodate the positive driving connection between a vehicle steering shaft.

The reaction member 88 may be formed with a first radial opening 114 which is in radial alignment with an opening 116 formed in the reaction ring 82. The closure member 72 is recessed in the vicinity of the opening 116, as indicated at 118, and a valve actuator element 120 is radially positioned in the openings 114 and 116 and in the recess 118 with the radial inward end thereof contacting the outer race of a needle bearing assembly 122 positioned about the piston rod 58. The valve actuator element 120 is formed with crowned shoulders 125 and 126 for contacting the sides of the openings 114 and 116 respectively, and it extends radially outward through an opening 128 formed in the surrounding cylindrical section 12 of the cast body 10. The radially outward end of the valve actuator element 120 is operatively connected to movable valve elements forming part of the control valve assembly generally designated at Figure 3 by numeral 130.

The valve assembly 130 comprises an outer valve body 132 suitably secured to the outer portion of the cast body 10 and is formed with a cylindrical opening 134 within which is positioned a valve sleeve 136. By preference the valve sleeve 136 is formed of a one- piece construction although I contemplate that a plurality of adjacent valve rings may also be used for this purpose.

The sleeve 136 is secured within the opening 134 by means of an externally threaded hold-down screw 138. The sleeve 136 is formed with a central opening 140 having a pair of spaced valve grooves 142 and 144 which cooperate with valve lands 146 and 148 respectively, the latter being formed on a movable spool valve element 150 which is adapted to be shifted axially within the opening 140 of the sleeve 146. One end 152 of the spool valve element 150 is threaded as indicated, and a coupling element 154 is threadably connected to this threaded end 152. The coupling element 154 is formed with a transverse opening 156 which is adapted to receive the crowned end 158 of the above-mentioned valve actuator element 120 to form a positive connection between the actuator element 120 and the movable spool valve element 150. The valve body 132 is formed with an opening 160 for the purpose of receiving therethrough the extended end of the valve actuating element 120. The open end of the valve body 132 may be closed by an end closure member 162 forming a threaded connection with the body 132 as indicated.

A fluid pressure supply conduit 164 is connected to valve body 132 and it communicates with an annular opening 166 formed about the valve sleeve 136. This opening 166 communicates with a groove 168 defined by the valve land 142 and an adjacent land 170 through a port 172. Similarly, the annular space 166 communicates with a groove 174 through a port 176, said groove 174 being defined by the valve land 148 and an adjacent land 178, the latter being provided with a peripheral fluid packing as indicated. The groove 142 in the valve sleeve 136 communicates with fluid working chamber 18 through a passage defined by a hollow sleeve 180, the latter extending through aligned openings formed in the cast body 10 of the fluid motor portion of the assembly and in the cast valve body 132 in the valve sleeve 136. Similarly, the groove 144 of the valve sleeve 136 communicates with the working chamber 16 through a passage defined by the hollow valve sleeve 182 positioned in and extending through other aligned openings in the cast body 10, valve body 132 and in the valve sleeve 136.

The annular space defined by the opening 140 and valve sleeve 136 and by the movable valve element 150 communicates with a centrally formed branch exhaust passage 184 through a port 186 and this passage 184 in turn communicates with an exhaust passage 188 formed in the valve body 132. A suitable fitting 190 may be provided, if desired, to accommodate a coupling with a suitable exhaust conduit. The passage 188 is controlled by a spring loaded check valve 192 which may be normally urged in a passage closing position, as indicated in Figure 3, by the spring 194. As exhaust pressure in the branch exhaust passage 184 increases, the check valve 192 is urged against the biasing force of the spring 194 until a grooved section 196 of the passage 188 becomes uncovered thereby permitting the passage of exhaust fluid from the valve assembly into the exhaust conduit. A spring 194 is seated on an adjustable seat 198 and it will be apparent that the pressure of the exhaust fluid in the vicinity of the valve mechanism may be controlled by adjustably positioning the seat 198 thereby varying the spring tension of the spring 194.

Referring again to Figure 1, it may be seen that the reaction member 88 and the reaction ring 82 are formed with other radially aligned openings 200 and 202 respectively, the common center line of which is situated in planes displaced 90° from the above-described openings 114 and 116 when viewed in the direction of the axis of the piston rod 58. A spring 204 is situated within the openings 200 and 202 with one end thereof engaging a cylindrical section 12 of the cast body 10 and with the other end engaging the outer race of the needle bearing assembly 122. The spring 204 is therefore effective to urge the piston rod 58 in a transverse direction thereby preloading the spaced recirculating ball circuits within the piston extension 22. This side loading eliminated backlash in the recirculating ball nut connection thereby increasing the sensitivity and responsiveness of the unit.

During operation of that portion of the disclosed structure hereinbefore described, the piston rod 58 may be manually rotated in either direction by the vehicle operator thereby imparting a reciprocating force to the piston 14 by reason of the driving connection between the rod 58 and the piston 14 provided by the recirculating ball nut connection. If it is assumed, for example, that the rod 58 is rotated in a clockwise direction when viewed from the right hand side of the structure as illustrated, a force will be applied to the piston 14 tending to move the same in the right hand direction. This force will be accompanied by an equal and oppositely directed reaction force on the piston rod 58 tending to shift the same in the left hand direction. Since the spacers 96 and 98 and the reaction member 88 are carried by the piston rod 58 with no provision for relative axial motion therebetween, this subassembly will tend to shift with respect to the fixed closure members 72 and 74. A clearance is provided between reaction member 88 and the closure member 72 as indicated at 206 and another clearance is provided between the reaction member 88 and the closure member 74 as indicated at 208, said clearances accommodating the above-described relative shifting movement. It will therefore be apparent that a clockwise turning effort applied to the piston rod 58 will be accommodated by a reduction in the clearance 206 and this in turn will cause the valve actuator element 120 to pivot about the crowned shoulder 126 in a clockwise direction as viewed in Figure 3. The spool valve element 150 will therefore be shifted in a right hand direction, as viewed in Figure 3, by reason of the positive connection between the coupling element 154 and the end 158 of the valve actuator element 120. This shifting movement of the valve element 150 will decrease the degree of communication between the port 176 and the valve groove 144 and between the exhaust port 186 and the annular valve groove 142 while simultaneously increasing the degree of communication between the port 172 and the valve groove 142 and between the exhaust port 186 and the valve groove 144. It will therefore be apparent that a pressure buildup will occur in working chamber 18 and that the working chamber 16 will be open to the exhaust circuit thereby creating a pressure differential across the piston 14 tending to move the piston 14 and the gear rack formed on the extension 22 to the right to supplement a manually applied steering effort. This movement of the piston 14 is accompanied by rotation of the rocker shaft 36 which imparts a steering movement to the dirigible wheels of the vehicle.

When steering effort is applied to the piston rod 58 in the opposite direction, it will be apparent that the clearance 208 between reaction member 88 and the closure member 74 will be reduced thereby causing the valve element 150 to be shifted in a left hand direction, as viewed in Figure 3, and this in turn will be accompanied by a pressure buildup in the working chamber 16 while the working chamber 18 is opened to the exhaust circuit. The pressure differential thus created across the piston 14 will supplement a manually applied steering effort to effect a steering movement of the dirigible wheels in the opposite direction.

Referring again to Figures 1 and 3, the closure members 72 and 74 are provided with concentric grooves defining reaction chambers identified by numerals 210 and 212. A reaction ring 214 is positioned within the reaction chamber 210 in overlapping and engaged relationship with respect to the reaction ring 82 and reaction member 88 and reaction ring 216 is positioned within the reaction chamber 212 in engaged overlapping relationship with respect to the reaction ring 82 and reaction member 88. A fluid seal 218 is positioned in the reaction chamber 210 against reaction ring 214 and similarly, a fluid seal 220 is positioned within the reaction chamber 212 in engagement with the reaction ring 216.

A reaction pressure passage 222 is formed in the closure member 72 for the purpose of interconnecting a pressure groove 224 within the reaction chamber 210 and another reaction pressure passage 226 is formed in another portion of the closure member 72 with one end thereof communicating with a pressure groove 224. The passage 226 communicates with a similar passage 228 formed in the closure member 74 which in turn extends to the reaction chamber 212. The pressure groove 224 is connected to the groove 174 formed in the spool valve element 150 by means of communicating reaction pressure branch passages 230 and 232 formed in the cast body 10 and the valve assembly 130. It will therefore be apparent that a pressure buildup in either of the working chambers will be accompanied by a pressure buildup in the reaction chambers 210 and 212 and thereby tending to oppose any relative shifting movement between the reaction ring 82 and the reaction member 88. This resistance to shifting movement of the piston rod will cause a corresponding increase in the manual effort required to move the piston 14 since the pressure reaction exerted on the reaction member 88 by the reaction rings 214 and 216 must be overcome before any power assist from the fluid motor becomes available. When the resistance to directional variation of the dirigible wheels is increased, a greater pressure buildup in the appropriate working chamber 16 or 18 will be required and this will be accompanied by a corresponding increase in the reaction pressure applied to the reaction chambers 210 or 212. Therefore the magnitude of the pressure reaction transmitted to the manually operable portions of the mechanism will be correspondingly increased and will be proportional to the steering requirements.

It will be observed that the effective reaction area of the reaction ring 216 is greater than the corresponding reaction area of the reaction ring 214, and therefore the magnitude of the reaction force applied to the reaction member 88 in the left hand direction, as viewed in Figures 1 and 3, will be greater than the reaction force applied in the right hand direction. This differential in the reaction forces is necessary in order to compensate for the fluid forces applied to the piston rod 58 tending to shift the same in a right hand direction. The force applied to the piston rod 58 is equal in magnitude to the difference in the forces exerted by the reaction rings 214 and 216 so that the total pressure reaction force applied to the manually operable portion of the mechanism in one direction will be equal to the forces applied thereto in the opposite direction.

Referring next to Figures 4 through 7, an enlarged detail view of the pressure reaction elements is shown for the purpose of illustrating the reaction limiting feature of my instant invention. Figure 4 is an enlarged view of the reaction elements, reaction member 88 and reaction ring 82 are in an aligned neutral position. The reaction ring 214 engages the reaction ring 82 throughout approximately two-thirds of its radial width and it engages the reaction member 88 throughout approximately one-third of its radial width. Similarly, the ratio of that portion of the radial width of the reaction ring 216 engaging the reaction ring 82 to the portion thereof engaging the reaction member 88 is also approximately 2:1.

Figure 5:
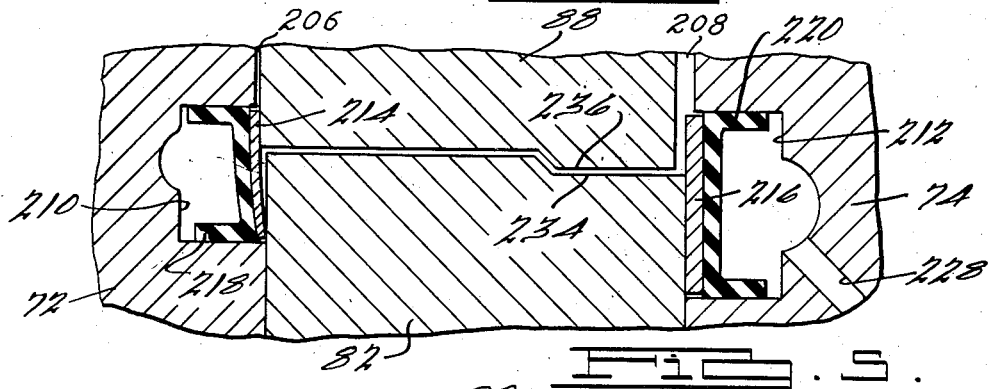
Figure 5 is a view of the structure shown in Figure 4 with portions thereof shown in a relatively displaced position which is indicative of the above-described extreme operating conditions.

In Figure 5 the reaction member 88 is shown in relatively shifted position with respect to the reaction ring 82 and the reaction ring 214 is displaced thereby tending to reduce the clearance 206 between the closure member 72 and the reaction member 88. The force exerted by the reaction pressure in the reaction chamber 210 is therefore effective to cause a pressure "feel back" in the manually operable portions of the system thus providing the vehicle operator with a normal steering sensation. If the resistance offered by the dirigible wheels becomes large, for example during parking maneuvers of the vehicle, the reaction pressure will build up to a value sufficiently large to cause the reaction element 214 to bend, as shown in Figure 5, until it contacts the relatively stationary reaction ring 82. When this contact takes place, a portion of the reaction force created by the reaction pressure in the reaction chamber 210 will be taken upon the fixed portion of the steering assembly thereby substantially reducing the magnitude of the steering resistance experienced by the vehicle operator upon any further increase in the working fluid pressure beyond that predetermined value at which the reaction ring 216 becomes deformed. It is emphasized that the reaction ring 216 does not bend under the pressure which caused the reaction element 214 to bend, as above described, because of the fact that the portion of the radial width of the reaction element 216 in contact with stationary reaction ring 82 represents a major portion of the total width. However, if the reaction member 88 should become shifted in the opposite direction due to the application of a steering effort to the piston rod 58 in the opposite direction, the outer peripheral edge of the reaction ring 216 will deflect in a manner similar to the above-described deflection of reaction ring 214. However, under these conditions the reaction ring 214 will retain its normal flat shape, as indicated in Figure 4, since the major portion of its radial width is in fixed engagement with the relatively stationary reaction ring 82.

Since the respective reaction area of the reaction ring 216 must necessarily be larger than the corresponding area of the reaction ring 214 for the reasons previously mentioned, it is necessary for the thickness of the ring 216 to be correspondingly greater than the thickness of the ring 214 in order that each of the rings might become deformed at the same reaction pressure. In one operative embodiment of my invention, the reaction rings 214 and 216 are caused to bend when the reaction pressure reaches a value of 450 p. s. i. and when the thickness of the reaction ring 216 is approximately 60% greater than that of reaction ring 214. Also, the total magnitude of the axial deflection of the outer peripheries of the reaction rings may be approximately .010".

In order to maintain the above-described ratio between the areas of reaction element 82 and reaction member 88 in engagement with the reaction ring 216 at a value of 2:1, the inside diameter of the reaction element 82 is increased as indicated at 234 while the outside diameter of the reaction member 88 is correspondingly increased as shown at 236.

After the reaction elements are deformed, as above indicated, upon a predetermined increase in reaction pressure, the rate of reaction force buildup thereafter is reduced to such an extent that the reaction feel back experienced by the operator will be 33% smaller for a given increase in working fluid pressure than the change in feel back obtained with a corresponding increase in working pressure at the lower pressure levels.

Figure 6:
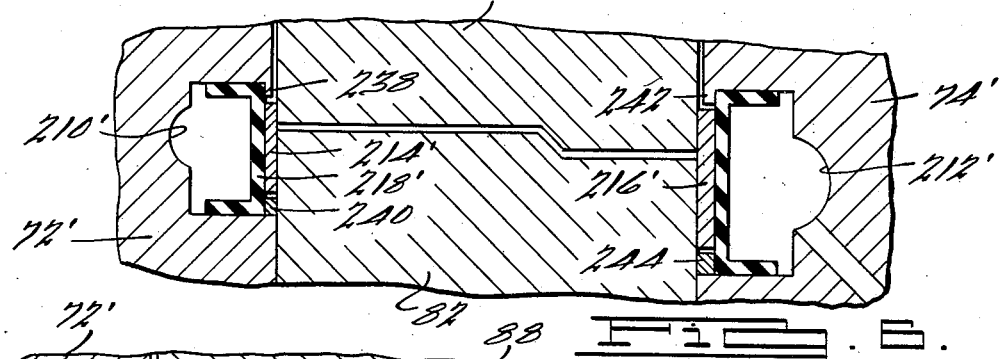
Figure 6 is a sectional view similar to Figures 4 and 5 showing a modified form of the pressure reaction feature of my instant invention.
Figure 7:
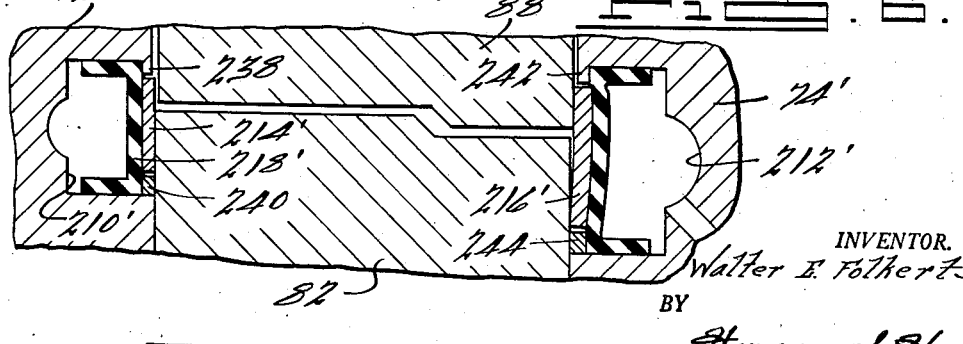
Figure 7 is a view showing the structure of Figure 6 with portions thereof in relatively displaced relationship indicative of the above-mentioned extreme operating conditions.

Referring next to Figures 6 and 7, I have provided a modified pressure reaction means which differs from that previously described in that the seals situated within the reaction chambers are not caused to slide relative to the stationary closure members during operation of the steering unit. One closure member of this modified embodiment is identified by numeral 72' and the other is identified by numeral 74' and they correspond to the closure members 72 and 74 in the previously described embodiment. A shoulder 238 is formed about the inner peripheral edge of the reaction chamber identified in Figure 6 by numeral 210' and a reaction ring 214' is disposed about the shoulder 238 in engaged and overlapping relationship with respect to the reaction member 88 and the reaction spacer ring 82. A spacer ring 240 is situated about the outer periphery of the reaction ring 214'. It will be observed that the reaction ring 214' engages only the center portion of the fluid backup seal for the reaction chamber 210 which is identified by numeral 218', and as the reaction member 88 becomes displaced to the left with respect to the reaction spacer ring 82, only the center portion of the seal 218 will deflect and no sliding movement between the seal 218' and the closure member 72' will take place. This feature eliminates friction in the system and increases the sensitivity of the unit.

The reaction chamber formed in the other closure member 74' is constructed in a manner similar to that of the previously described reaction chamber 210 and it is identified in Figures 6 and 7 by numeral 212'. The closure member 74' is formed with a shoulder 242 corresponding to the above-mentioned shoulder 238 of the closure member 72' and is provided with a spacer 244 corresponding to the above-mentioned spacer 240. The reaction ring for the reaction chamber 212' is identified by numeral 216' and is formed with an effective reaction area which is greater than that of the reaction ring 214′ for the reasons previously discussed with regard to the previous embodiment. Upon movement of the reaction member 88 to the right with respect to the stationary reaction element 82 during steering maneuvers, the reaction ring 216′ will become unseated from the reaction ring 82 and if the reaction pressure exceeds a predetermined limiting value, the outer peripheral edge of the reaction ring 216′ will become deformed, as indicated in Figure 7, until it contacts the stationary reaction ring 82. Upon a further increase in reaction pressure, the change in the magnitude of the reaction "feel back" will be less than the change in the reaction "feel back" which will be experienced for a corresponding change in the reaction pressure at the lower pressure level.

Having thus described certain preferred embodiments of my invention, what I claim and desire to secure by United States Letters Patent is:

1. In a power boosting mechanism, a fluid motor having a movable piston member, a driven member connected to said piston member, a fluid passage having branch portions communicating with opposed sides of said piston, valve means situated within said passage means partly defining the same for selectively distributing fluid pressure to either side of said piston while simultaneously exhausting fluid from the other side thereof, a manually operable member, means for connecting a movable portion of said valve means to said manually operable member to permit manual actuation of said valve means, a reaction member carried by said manually operable member, a flexible reaction element engageable with said reaction member, means for applying reaction fluid pressure from a high pressure portion of the mechanism to said reaction element for resisting movement of said manually operable member, said reaction element being adapted to deform when subject to a reaction pressure buildup and to contact a relatively fixed portion of said mechanism to transmit said reaction pressure thereto when said reaction pressure buildup exceeds a limiting value, thereby reducing the rate of increase in the resistance to manual movement of said manually operable member for a given increase in reaction fluid pressure at reaction pressures in excess of said limiting value, said flexible reaction element engaging said reaction member with a force comprising a direct function of said reaction pressure buildup even when said reaction element is also engaging said relatively fixed portion.

2. In a power boosting mechanism, a fluid motor having a movable piston member, a driven member connected to said piston member, a fluid passage having branch portions communicating with opposed sides of said piston, valve means situated within said passage means and partly defining the same for selectively distributing fluid pressure to either side of said piston while simultaneously exhausting fluid from the other side thereof, a manually operable member drivably connected to said piston, a mechanical connection between said manually operable member and a movable portion of said valve means for actuating the latter in response to manual operation of the former, a reaction member carried by said manually operable member, a flexible reaction element engageable with said reaction member, passage means for subjecting said reaction element to the fluid pressure existing in a high pressure portion of the mechanism thereby creating a resistance to movement of said manually operable member, said reaction element being adapted to deform and to engage a stationary portion of said mechanism for partial support thereby in opposition to said fluid pressure upon an increase in the magnitude thereof in excess of a limiting value thereby reducing the magnitude of the change in said resistance for a given change in said fluid pressure.

3. In a power boosting apparatus having a manually operable portion and a driven portion, a fluid motor in an operative fluid circuit for actuating said driven portion, a flexible reaction element engageable with said manually operable portion, means cooperable with said circuit for subjecting said reaction element to a reaction pressure comprising a direct function of the fluid pressure existing in a high pressure portion of said fluid motor to oppose manual operation of said manually operable member, said reaction element being adapted to deflect and to engage a relatively stationary portion of said apparatus upon an increase in said reaction pressure to a value in excess of a limiting value, thereby to distribute the reaction pressure between said manually operable member and said stationary portion, said flexible reaction element engaging said manually operable member with a force comprising a direct function of said reaction pressure even when said reaction element is also engaging said relatively stationary portion.

4. In a power boosting mechanism, a cylinder, a piston member slidably received within said cylinder and defining therewith a working chamber, a driving member positively connected to said piston, a manually operable member secured to said piston, means for accommodating lost motion in the direction of the axis of said cylinder between relatively stationary portions of the mechanism and said manually operable member upon rotation of the latter, a fluid pressure supply passage communicating with said working chamber, valve means situated in said passage for controlling the degree of pressure buildup in said working chamber, a mechanical connection between said manually operable member and said valve means for actuating the latter in response to axial movement of the former, a reaction member carried by said manually operable member, said reaction member being situated adjacent a relatively stationary portion of said mechanism, a flexible reaction element contacting said reaction member, means for subjecting said reaction element to the fluid pressure existing in said passage thereby creating a reaction force on said manually operable member which is proportional in magnitude to the magnitude of the pressure buildup in said working chamber, said reaction element being adapted to deform and to contact said relatively stationary portion for partial support thereby in opposition to said pressure buildup when said pressure buildup reaches a predetermined value, thereby causing the reaction forces to be distributed between said manually operable member and said stationary portions, said flexible reaction element engaging said manually operable member with a force comprising a direct function of said pressure buildup even when said reaction element is also engaging said relatively stationary portion.

5. In a power boosting mechanism, a cylinder, a piston slidably received within said cylinder, a driven member connected to said piston, a manually operable shaft connected to said piston, a fluid pressure delivery passage having portions communicating with each side of said piston, valve means situated in said passage for controlling the distribution of fluid pressure to each side of said piston, means for accommodating a limited lost motion in an axial direction between said shaft and relatively stationary portions of the mechanism, a mechanical connection between said shaft and said valve means for actuating the latter in response to axial movement of the former, a first shoulder carried by said shaft, a second shoulder formed on said relatively stationary portions adjacent said first shoulder, a flexible reaction element of generally circular configuration surrounding said shaft and said first shoulder, means for subjecting said reaction element to the fluid pressure existing in said passage for creating a pressure reaction force which opposes said lost motion, the outer periphery of said reaction element being resiliently displaced with respect to said first shoulder upon an increase in the fluid pressure acting thereon to a value in excess of a limiting value thereby causing the same to engage said second shoulder, the reaction force acting on said reaction element being transmitted to both of said shoulders when said reaction element assumes a displaced condition.

6. In a power boosting mechanism, a cylinder, a piston slidably received within said cylinder, a driven member connected to said piston, a manually operable shaft connected to said piston, a fluid pressure delivery passage having portions communicating with each side of said piston, valve means situated in said passage for controlling the distribution of fluid pressure to each side of said piston, means for accommodating a limited lost motion in an axial direction between said shaft and relatively stationary portions of the mechanism, a mechanical connection between said shaft and said valve means for actuating the latter in response to axial movement of the former, a first shoulder secured by said shaft, a second shoulder formed on said relatively stationary portions in surrounding relationship with respect to said first shoulder, a flexible reaction element surrounding said shaft in engaged relationship with respect to said first shoulder, said reaction element being flat and having concentric and coplanar inner and outer peripheries, means for subjecting said reaction element to the fluid pressure which exists in said delivery passage thereby creating a pressure reaction force which opposes said lost motion, the outer periphery of said reaction element being resiliently displaced out of the plane of the inner periphery thereof upon an increase in the fluid pressure acting thereon to a value in excess of a limiting value thereby causing said outer periphery to engage said second shoulder thus causing the reaction force acting on said reaction element to be transmitted simultaneously to both of said shoulders.

7. The combination as set forth in claim 6 wherein the reaction area on said reaction element in contact with the first shoulder is approximately one-third the total effective reaction area.

8. In a power boosting mechanism, a cylinder, a piston slidably received within said cylinder, a driven member connected to said piston, a manually operable shaft connected to said piston and extending axially of said cylinder, a fluid pressure delivery passage having portions communicating with each side of said piston, valve means situated in said passage for controlling the distribution of fluid pressure to each side of said piston, a centrally apertured closure assembly secured within said cylinder, said manually operable shaft extending through said closure assembly, means for accommodating limited lost motion in an axial direction between said shaft and said closure assembly, a mechanical connection between said shaft and said valve means for actuating the latter in response to axial movement of the former, a first reaction member carried by said manually operable shaft, said reaction member having radially extending and axially spaced shoulders, another reaction member carried by said closure assembly in surrounding relationship with respect to said first reaction member, said other reaction member also having radially extending and axially spaced shoulders, a first flexible centrally apertured disc situated in contacting relationship with respect to one shoulder of each of said reaction members and a second flexible centrally apertured disc situated in contacting relationship with respect to the other shoulders of these said reaction members, an annular reaction chamber formed on one side of each of said reaction elements within said closure assembly, a fluid seal within each of said reaction chambers engaging its associated reaction disc, means for subjecting said reaction chambers to the fluid pressure existing in said delivery passage thereby creating a reaction force tending to oppose relative movement between said reaction members, the outer periphery of each of said reaction elements being resiliently displaced with respect to the inner periphery thereof when the fluid pressure within said reaction chambers exceeds a predetermined value, said reaction elements engaging only one of said reaction members when said reaction members are relatively displaced and when the fluid pressure in said reaction chambers is below said limiting value, one of said reaction elements engaging both of said reaction members upon relative movement of said reaction members when the pressure in said reaction chambers exceeds said limiting value.

9. The combination set forth in claim 8 wherein the area of said reaction elements in contact with said first shoulder is approximately one-third the total reaction area of the same.

10. In a power boosting apparatus having manually operated means and driven means, a fluid motor in an operative fluid circuit for actuating said driven means, valve means disposed in said fluid circuit for controlling the distribution of operating pressure to said motor, said manually operated means including a relatively shiftable element of said valve means, a flexible reaction element, and means for applying reaction pressure to said reaction element as a direct function of said operating pressure, said reaction element being engageable with said manually operated means to transmit said reaction pressure thereto in opposition to manual operation thereof, and said reaction element also being flexible under said reaction pressure to engage a movement limiting portion of said apparatus to transmit said reaction pressure to the latter portion as well as to said manually operated means as direct functions of said reaction pressure when said reaction pressure exceeds a limiting value, thereby to reduce the rate of increase of resistance to said manual operation for a given increase in said operating pressure when said reaction pressure exceeds said limiting value.

11. In a power boosting apparatus having manually operated means and driven means, a fluid motor in an operative fluid circuit for actuating said driven means, valve means disposed in said fluid circuit for controlling the distribution of operating pressure to said motor, said manually operated means including a relatively shiftable element of said valve means, a flexible reaction element, and means for applying reaction pressure to said reaction element as a direct function of said operating pressure, said reaction element having one portion engageable with said manually operated means to transmit said reaction pressure thereto in opposition to manual operation thereof, and said reaction element also being flexible under said reaction pressure to engage a relatively fixed movement limiting element of said apparatus to distribute a portion of said reaction pressure thereto when said reaction pressure exceeds a limiting value, thereby to reduce the rate of increase of resistance to said manual operation for a given increase in said operating pressure when said reaction pressure exceeds said limiting value, said reaction element being sufficiently flexible so that said one portion engages said manually operated means with a force comprising a direct function of said reaction pressure even after said reaction element has flexed to engage said movement limiting element.

References Cited in the file of this patent

UNITED STATES PATENTS

| 2,596,242 | Hill | May 13, 1952 |
| 2,719,511 | Presnell | Oct. 4, 1955 |

FOREIGN PATENTS

| 516,773 | Canada | Sept. 20, 1955 |

U. S. DEPARTMENT OF COMMERCE
PATENT OFFICE
CERTIFICATE OF CORRECTION

Patent No. 2,828,721                                     April 1, 1958

Walter E. Folkerts

It is hereby certified that error appears in the printed specification of the above numbered patent requiring correction and that the said Letters Patent should read as corrected below.

Column 10, line 19, for "driving" read --driven--.

Signed and sealed this 27th day of May 1958.

(SEAL)
Attest:
KARL H. AXLINE
Attesting Officer

ROBERT C. WATSON
Commissioner of Patents